United States Patent [19]

Bluege

[11] Patent Number: 4,887,276
[45] Date of Patent: Dec. 12, 1989

[54] SHARED APERTURE SAMPLER

[75] Inventor: John H. Bluege, Lake Park, Fla.

[73] Assignee: United Technologies, Hartford, Conn.

[21] Appl. No.: 39,037

[22] Filed: Apr. 16, 1987

[51] Int. Cl.⁴ .............................................. H01S 3/08
[52] U.S. Cl. ...................................... 372/103; 372/19; 372/98; 372/99; 372/101; 372/108
[58] Field of Search ...................... 372/20, 32, 33, 98, 372/99, 101, 102, 103, 108, 19, 27, 28, 92; 350/444

[56] References Cited

U.S. PATENT DOCUMENTS

| | | | |
|---|---|---|---|
| 4,015,906 | 4/1977 | Sharon | 356/138 |
| 4,140,398 | 2/1979 | Hodder | 356/152 |
| 4,141,652 | 2/1979 | Feinleib | 356/121 |
| 4,271,355 | 6/1981 | Wisner et al. | 250/201 |
| 4,281,896 | 8/1981 | Coccoli | 350/171 |
| 4,326,800 | 4/1982 | Fitts | 356/152 |
| 4,467,186 | 8/1984 | Goralnick et al. | 250/201 |
| 4,477,720 | 10/1984 | Pearson | 250/201 |
| 4,518,854 | 5/1985 | Hutchin | 250/201 |
| 4,547,662 | 10/1985 | Cornwell | 250/201 |
| 4,686,684 | 8/1987 | Dalton et al. | 372/99 |

Primary Examiner—William L. Sikes
Assistant Examiner—B. R. R. Holloway
Attorney, Agent, or Firm—Eric. W. Petraske

[57] ABSTRACT

An improved shared aperture sampler for high power laser beams includes a buried mirror positioned behind a dichroic reflective surface that reflects the high power beam and permits the sample beam to pass through and to be focused or deflected by the buried mirror.

7 Claims, 1 Drawing Sheet

U.S. Patent    Dec. 12, 1989    4,887,276
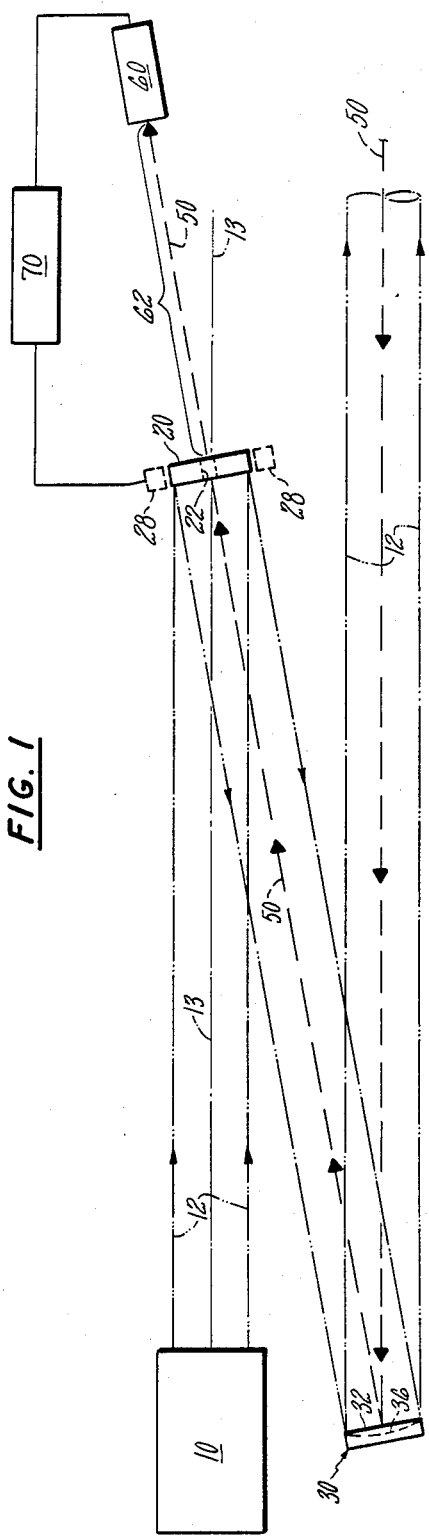
FIG. 1
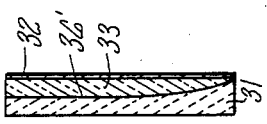
FIG. 4
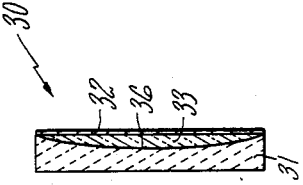
FIG. 3
FIG. 2

SHARED APERTURE SAMPLER

TECHNICAL FIELD

The field of the invention is that of high power laser systems including a high intensity output beam and a low intensity return beam used for control of the laser and/or the aiming and focusing properties of the optical train of the laser system.

BACKGROUND ART

High power laser systems typically include the laser itself followed by an "optical train" which is a series of mirrors and/or gratings to transport the beam from the laser and to direct it towards a target or workpiece. Some laser systems include a deformable mirror used to control the parameters of the output beam in order to correct for distortion that may be introduced in the laser or in the atmosphere between the optical train and the target. When such a control system is used, a return beam that is composed of radiation reflected from the target is used as input to an optical sensor. A processing system controls the deformable mirror in order to cause the return beam to meet some predetermined criterion. Minimum distortion is provided by a system that includes a shared aperture sampler, which is an element of the optical train that both reflects the high power beam and also reflects and samples the target return beam. It is necessary for this sampler, of course, to withstand the thermal load imposed by the high power beam and also to introduce essentially no distortion in the target return beam. If distortions are introduced, the correction system will be given a false input.

In the prior art, shared aperture samplers have used diffraction gratings on the surface of a mirror and/or buried below the surface in order to deflect a portion of the target return in a different frequency range from that of the laser output beam. The sampled beam is directed at a detector having a suitable frequency response. Another approach in the prior art is the use of a dichroic coating on the front surface of the shared aperture sampler that reflects the high intensity beam and passes a certain frequency in the target return beam. The portion of the target return beam that passes through the dichroic coating then strikes a second reflective surface that deflects it out of the optical train. The gratings suffer from high throughput loss and also are subject to considerable frequency dispersion. The wedges have less dispersion but suffer serious thermal distortion.

DISCLOSURE OF THE INVENTION

The invention relates to an improved shared aperture sampler in which a dichroic coating reflects a high intensity beam along the output beam direction while permitting a different frequency range and/or polarization in the target return beam to pass through. A second surface below the dichroic coating has a nominally spherical contour that focuses or defocuses the target return beam. Alternatively, the top surface may be curved and the bottom flat or some combination of the two. The target return beam will then pass back through the dichroic coating and along the output beam direction becoming smaller or larger than the high intensity beam, depending on whether it has been focused or defocused. When the diameter of the target return beam is sufficiently different from that from the high intensity portion of the laser output beam, it may be deflected out of the optical train. This removal may take place by passing a small target return beam through an aperture in a mirror, particularly in the case where the laser output beam has an intensity maximum displaced from the optic axis. In the case where the laser output beam has an intensity on-axis, the target return beam may be defocused and removed by an annular mirror that has an inner radius substantially larger than the radius of the laser beam.

A feature of the invention is the separation in radius of the target return beam from the laser output beam.

Another feature of the invention is the ability of the target return beam to pass through one or more intermediate elements of the optical train before being removed from the optical train.

Another feature of the invention is the freedom afforded to place an optical detector for the target return beam in a convenient location.

Other features and advantages will be apparent from the specification and claims and from the accompanying drawings which illustrate an embodiment of the invention.

BRIEF DESCRIPTION OF THE DRAWINGS

FIG. 1 illustrates in partially schematic, partially pictorial form, an embodiment of the invention.

FIG. 2 illustrates a cross section of a shared optical aperture sampler according to the invention.

FIG. 3 illustrates an alternate version of a shared aperture sampler.

FIG. 4 illustrates an alternate version of a sampling device for removing the target return beam from the optical train.

BEST MODE FOR CARRYING OUT THE INVENTION

Referring now to FIG. 1, there is shown a simplified version of a high power laser system. Laser 10 generates an output beam 12 traveling along an axis 13 from left to right. One turning mirror 20 within the optical train is shown, together with the shared optical sampler 30. The high power beam continues outward to the right after leaving sampler 30 and is directed towards a target. An actual optical train will include more elements than this, of course, and in particular there may be elements located between mirrors 20 and 30.

The term "optical train" will be used to refer both to the reflective elements or gratings within the optical system and also to the volume occupied within that optical system by output beam 12. When the sample beam is referred to as being deflected from the optical train, the meaining is that the axis of the target return beam is deflected from axis 13 of the laser output beam and the cross section of the target return beam is separated from the cross section of the laser output beam. This is, of course, necessary so that the optical detection device that receives the sample beam will not be struck by the high power laser beam.

In FIG. 1, a target return beam indicated by the dashed line labeled with the numeral 50 enters from the right in FIG. 1 and strikes shared aperture sampler 30. It passes through dichroic coating 32 on the front surface of sampler 30 and is reflected from mirror surface 36 which may be the surface of the substrate 31 of sampler 30 or may be a coating placed on that surface to reflect radiation at the target return frequency. The target return beam is focused in this case since surface 36 is concave. The target return beam continues along the same direction as the laser output beam until it mirror 20. In this embodiment of the invention, mirror 20 has an on-axis aperture 22. The focal length of mirror 36, the diameter of the aperture 22 and the distance between the two elements 30 and 20 are selected such that the target return beam reaches its focal point approximately at the position of mirror 20. It is not necessary, of course, that mirror 20 be located exactly at the focal point of sampler 30. High power laser systems are typically tightly constrained in geometry and tradeoffs have to be made among many factors.

This embodiment is adapted for the situation in which laser beam 12 has an intensity maximum that is at a predetermined radius from axis 13, not on axis 13; i.e., such as an offset gaussian "doughnut" intensity distribution. In that case, the intensity maximum on the surface of mirror 20 will be outside the diameter of aperture 22 so that the laser output beam radiation that strikes aperture 22 and continues along the direction of axis 13 will be relatively low in power compared to the power reflected from the surface of mirror 20.

The target return beam, having passed through aperture 22, continues along the direction indicated by line 50 for a distance 62 until it either strikes detector 60 or additional optical elements which direct it to the detector. The distance 62 is selected such that detector 60 is sufficiently displaced from the radiation that passes through aperture 22 along axis 13. Detector 60 will be responsive to radiation in this same frequency range that passes through dichroic coating 32 and is reflected from coating 36. Filters may be used on detector 60 in order to make it nonresponsive to any output beam radiation that may leak into the detector. Detector 60 produces a signal in one of several forms known to those skilled in the art. The signal may represent the entire wave front of the target return beam or it may be a simple signal indicating the power at the center or on the axis of target return beam 50. The simple signal will be used to maximize the amount of power delivered to the target and the complicated phase-front signal may be used in a case in which the return beam represents accurately the total effects of the entire path from the laser to the target and back. A conventional reference to those skilled in the art for different types of control systems is "Modern Control Systems", by Richard Dorf.

Controller 70, which may be a general purpose digital computer or may be a dedicated logic system, receives the signals from detector 60 and generates controls to mirror 20. Mirror 20, in this case, is a deformable or steering mirror that may be adjusted in response to the signals on detector 60 to change the phase or intensity of output beam 12 in order to produce the desired signal or desired beam shape in the target return beam 50. It is not necessary, in general, that the same mirror that passes the radiation out of the optical train or deflects it out of the optical train, be a deformable mirror. This combination is selected in order to have a simple drawing.

The operation of this system with regards to separating the target return beam from the high power beam will be described for the purposes of this application as "focusing" which is taken herein to include transforming a converging, collimated or diverging target return beam in order to change the radial intensity distribution of the target return beam to be sufficiently different from that of the laser output beam that the two beams may be separated.

This approach is in contrast to that of the prior art, in which the shared aperture sampler also deflects the target return beam out of the optical train by changing the direction of propagation of the optical return beam relative to the output beam axis. In this case, the shared aperture sampler does not necessarily change the direction of propagation but focuses the target return beam. Minimum system distortion is usually incurred when both beam axes are parallel.

An important practical advantage of this approach compared to that of the prior art is that the target return beam can pass through or reflect from several elements in the optical train before it strikes the detector. In the prior art, practical constraints on mirror size and added distortion necessitated that the target return beam be separated from the high power beam before it reached the next element in the optical train. This required a substantial deflection angle and thus in turn required a substantial wedge thickness or thickness between the dichroic coating 32 and the reflective surface 36. With the present approach, the focal length of surface 36 can be made very long so that the distance between surfaces 32 and 36 is correspondingly very small.

Referring now to FIG. 2, there is shown in cross section, one embodiment of the shared aperture sampler 30. Dichroic coating 32 must reflect the high power output beam without introducing distortion. In order for that to take place, it must be adequately cooled by conventional cooling means not shown within substrate 31. Since the material of substrate 31 will often not be the same as the material 33 filling the space between reflective surface 36 and dichroic coating 32, the cooling properties at the edge will not be the same as the cooling properties at the middle. There will thus necessarily be differential heat loads between the center and the edge of sampler 30 which will cause thermal distortion. The longer the focal length of surface 36 the less the distance between the two surfaces and the lower the amount of distortion.

For the on axis or nearly on axis configuration, the maximum required thickness (and resulting distortion) of the transparent layer are substantially less than that required to deflect the target beam to the side of the high power beam.

Another advantage of this embodiment with a concave surface 36 is that most high intensity laser beams have a maximum intensity at some predetermined radius from the optic axis. In such a case, the thickest portion of material 33 receives a relatively low heat load, so that the distortion is kept at a minimum.

In a particular embodiment, substrate 31 is made of silicon carbide and material 33 is silicon. Surface 36 will be machined to a predetermined contour and the corresponding surface of material 33 will be machined to the complementary contour. Surface 36 will be coated and the two materials bonded together. In a typical high intensity laser having an obscuration factor (ratio of the hole size to the beam diameter) of 0.05, a length between elements of two meters (allowing for complete removal of the sample from a collimated high power beam), a beam half-width of five centimeters and a refractive index of 3.42 for silicon, the distance sag calculated from the formula above would be 87 micrometers.

In an alternative embodiment, surface 36 may be convex, not concave, and the beam may be removed by using an annular mirror indicated by the dotted boxes labeled with a numeral 28 disposed outside of turning mirror 20. This annular mirror will be tilted at a slight angle with respect to axis 13 of the output beam so that the target return beam will be reflected from the annular mirror at an angle different from the direction of travel of the laser output beam.

FIG. 3 illustrates an alternative embodiment of the sampler 30 in which the surface 36' has a concave spherical contour but the center of that sphere is displaced from the axis 13. This surface 36' both converges and deflects the target return beam. A suitable optical detector 60 would be displaced at a convenient location to one side of the optical train and the necessity for an aperture would be eliminated. A disadvantage of this approach is that for a collimated high power beam the thickness of silicon 33 is approximately four times that required for the embodiment of FIG. 2, for a comparable system. This penalty increases if the target return beam must be removed from an increased aperture (divergent) high power beam, and decreases if the target is removed to the side of a focused beam.

A further alternative to mirror 20 is illustrated in FIG. 4, in which a second reflective surface 23 which may be a wedge, prism, or grating is located at the center of mirror 20'. This surface is tilted at an angle to deflect the converging sample beam away from the axis 13 of the laser output beam. Again, this alternative is appropriate for a doughnut laser output beam in which the maximum intensity is outside the region covered by surface 23.

As a further alternative, surface 23 could be a grating formed in the surface of mirror 20, since the converging sample beam will have a different frequency from the output laser beam.

An alternative fabrication embodiment utilizes one or more intervening layers, usually comprised of the same material used in the transparent layer, to minimize thermomechanical-optical stresses and/or to deflect one or more additional beams.

It should be understood that the invention is not limited to the particular embodiments shown and described herein, but that various changes and modifications may be made without departing from the spirit and scope of this novel concept as defined by the following claims.

I claim:

1. A laser system comprising:
    a laser for generating a laser output beam having a laser frequency range, a laser beam radius and traveling along an output beam axis in an output direction;
    an optical train for transmitting and directing said laser output beam, for receiving a target return beam responsive to said laser output beam, and for directing said target return beam substantially along said output beam axis in a return direction opposite to said output direction;
    a shared aperture optical sampler included in said optical train and having a first surface disposed to receive both said laser output beam and said target return beam, said first surface being refractive in said laser frequency range and transmissive in a second frequency range, and a second surface behind said first surface that is reflective in said second frequency range, whereby a sample portion of radiation in said target return beam that is within said second frequency range penetrates said first surface and is reflected from said second surface to form a sample target return beam;
    optical detection means for receiving a selected portion of said sample target return beam and generating a return beam signal in response thereto;
    control means connected to said optical detection means, for receiving said return beam signal and generating optical control signals; and
    a controllable optical element within said optical train and connected to said control means, for adjusting said laser output beam in response to said optical control signals; characterized in that:
    said second surface has a non-planar contour symmetric about said output beam axis and having a predetermined focal length to focus said sample target return beam;
    said optical train includes a sampling optical element, having a sampler radius substantially different from said output beam radius and located along said output axis at a distance displaced from said shared aperture optical sampler in said return direction by approximately said predetermined focal length, whereby said sample target return beam is removed from said optical train.

2. A laser system according to claim 1, in which said laser output beam has an intensity maximum at a predetermined radius substantially greater than said sampler radius, and said sampling optical element is a substantially on-axis aperture in a reflective element of said beam train, whereby said target return beam and a relatively small fraction of the energy in said laser output beam pass through said aperture.

3. A laser system according to claim 1, in which said non-planar contour is concave, said laser beam has an intensity maximum at a predetermined radius substantially greater than said sampler radius, and said sampling element includes reflective means within said sampler radius for reflecting said sample target return beam away from said output beam axis toward said optical detection means.

4. A laser system according to claim 3, in which said sampling element is a reflective surface.

5. A laser system according to claim 3, in which said sampling element is a diffraction grating.

6. A laser system according to claim 1, in which said laser beam has an intensity maximum substantially at said output beam axis, said spherical contour is convex, and said sampling element includes annular reflective means disposed about said output beam axis and having an inner radius comparable to said laser beam radius.

7. A laser system according to claim 1, in which said optical train includes at least one element disposed on said output beam axis between said shared aperture optical sampler and sampling optical element.

* * * * *